(12) United States Patent
Pazhayakath et al.

(10) Patent No.: US 8,930,604 B2
(45) Date of Patent: Jan. 6, 2015

(54) RELIABLE NOTIFICATION OF INTERRUPTS IN A NETWORK PROCESSOR BY PRIORITIZATION AND POLICING OF INTERRUPTS

(75) Inventors: Benzeer Bava Arackal Pazhayakath, Bangalore (IN); Santosh Narayanan, Bangalore (IN)

(73) Assignee: LSI Corporation, Milpitas, CA (US)

( * ) Notice: Subject to any disclaimer, the term of this patent is extended or adjusted under 35 U.S.C. 154(b) by 226 days.

(21) Appl. No.: 13/551,002

(22) Filed: Jul. 17, 2012

(65) Prior Publication Data

US 2014/0025856 A1 Jan. 23, 2014

(51) Int. Cl.
*G06F 13/24* (2006.01)

(52) U.S. Cl.
USPC .............................. 710/263; 710/52; 710/260

(58) Field of Classification Search
USPC ............................................ 710/260, 52, 263
See application file for complete search history.

(56) References Cited

U.S. PATENT DOCUMENTS

| 7,191,258 B2 * | 3/2007 | Jeong .............................. 710/22 |
| 7,447,152 B2 * | 11/2008 | Kim et al. ...................... 370/231 |
| 7,529,245 B1 * | 5/2009 | Muller et al. .................. 370/394 |
| 7,533,201 B2 * | 5/2009 | Chew .............................. 710/56 |
| 7,646,759 B2 | 1/2010 | Hegde et al. |
| 7,710,989 B2 * | 5/2010 | Chew .............................. 370/412 |
| 8,010,696 B2 | 8/2011 | Sankaran et al. |
| 2005/0157723 A1 * | 7/2005 | Kim et al. ...................... 370/392 |
| 2006/0251109 A1 * | 11/2006 | Muller et al. ................. 370/463 |
| 2007/0058649 A1 * | 3/2007 | Kytomaa et al. .............. 370/412 |
| 2008/0155139 A1 * | 6/2008 | Chew .............................. 710/52 |
| 2008/0219279 A1 * | 9/2008 | Chew .............................. 370/412 |
| 2011/0317713 A1 * | 12/2011 | Assarpour et al. ............ 370/412 |
| 2013/0019042 A1 * | 1/2013 | Ertugay et al. ................ 710/267 |

FOREIGN PATENT DOCUMENTS

EP 1249757 B1 8/2009

OTHER PUBLICATIONS

Tanenbaum, Andrew S.; "Structured Computer Organization"; Prentice-Hall, Inc.; 1990; Third Edition; pp. 11-13.*
"APP3300 Communication Processor," Product Brief, LSI Corporation, Feb. 12, 2014, Retrieved from http://www.lsi.com/downloads/Public/Network Processors/APP3000 Family/LSI-PB-APP3300.pdf, pp. 2 pages.

* cited by examiner

*Primary Examiner* — Ryan Stiglic
(74) *Attorney, Agent, or Firm* — Daniel J. Santos; Smith Risley Tempel Santos LLC

(57) ABSTRACT

In a data network, a node determines whether to handle data-dependent events using the node's hardware interrupt buffer or instead using an available fallback action. The node classifies each detected event as being one of a plurality of different categories of events and determines, based on the classified category, whether to handle the detected event using the hardware interrupt buffer of the node. Each different event category can be assigned its own scale factor, where the available (i.e., currently unused) capacity of the hardware interrupt buffer is allocated based on those programmed scale factors. If the node determines to handle the detected event using the hardware interrupt buffer, then the node stores a hardware interrupt corresponding to the detected event in the hardware interrupt buffer. Otherwise, the node handles the detected event using a fallback action.

23 Claims, 3 Drawing Sheets

US 8,930,604 B2

RELIABLE NOTIFICATION OF INTERRUPTS IN A NETWORK PROCESSOR BY PRIORITIZATION AND POLICING OF INTERRUPTS

BACKGROUND

1. Field of the Invention

The present invention relates to computer systems and, more specifically but not exclusively, to the handling of interrupt-triggering events in computer systems.

2. Description of the Related Art

This section introduces aspects that may help facilitate a better understanding of the invention. Accordingly, the statements of this section are to be read in this light and are not to be understood as admissions about what is prior art or what is not prior art.

The architecture of a conventional node in a data network has a data plane and a control plane. The data plane is configured to handle normal processing of an incoming data stream to produce a corresponding outgoing data stream. At times, events occur that require special processing. Typical events include, without limitation, MAC (media access control) learning, OAM (operations, administration, and maintenance)-related state changes, counter overflows. In conventional nodes, such events are processed as hardware interrupts, where the control plane performs the required special processing for such hardware interrupts.

A conventional node is provisioned with an interrupt buffer of a finite size. Each instance that the data plane detects an event requiring special handling, the data plane adds a hardware interrupt to the interrupt buffer. Concurrently, the control plane processes hardware interrupts stored in the interrupt buffer on a first-in, first-out basis.

If hardware interrupts are added to the interrupt buffer by the data plane faster than the control plane can process those hardware interrupts, the interrupt buffer may become temporarily full, thereby preventing any additional hardware interrupts from being added to the interrupt buffer until the interrupt processing of the control plane frees up sufficient space in the interrupt buffer. Such interrupt-buffer overflow results in one or more new hardware interrupts being dropped by the node, thereby failing to perform the special processing required to handle the events that triggered those dropped hardware interrupts. The failure to perform the required special processing for some types of events that trigger hardware interrupts (e.g., MAC learning or OAM-related state change) may be inconsequential, but not for all types of interrupt-triggering events. For some types of events (e.g., counter overflow), the failure to perform the required special processing can be catastrophic to the proper functioning of the node and possibly of the entire network.

SUMMARY

One embodiment of the disclosure is a node-implemented method for handling events by a node in a data network. Data received at the node is processed to detect an event. The detected event is classified as being one of a plurality of different categories of events. It is determined, based on the classified category of the detected event, whether to handle the detected event using a hardware interrupt buffer of the node. A hardware interrupt corresponding to the detected event is stored in the hardware interrupt buffer, if the determination is to handle the detected event using the hardware interrupt buffer. The detected event is handled using a fallback action, if the determination is not to handle the detected event using the hardware interrupt buffer.

Another embodiment of the disclosure is a node for a data network, the node comprising a hardware interrupt buffer, a data plane, and a control plane. The data plane is configured to (a) process data received at the node to detect an event; (b) classify the detected event as being one of a plurality of different categories of events; (c) determine, based on the classified category of the detected event, whether to handle the detected event using the hardware interrupt buffer; (d) store, in the hardware interrupt buffer, a hardware interrupt corresponding to the detected event, if the determination is to handle the detected event using the hardware interrupt buffer; and (e) handle the detected event using a fallback action, if the determination is not to handle the detected event using the hardware interrupt buffer. The control plane is configured to process the hardware interrupt stored in the hardware interrupt buffer.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
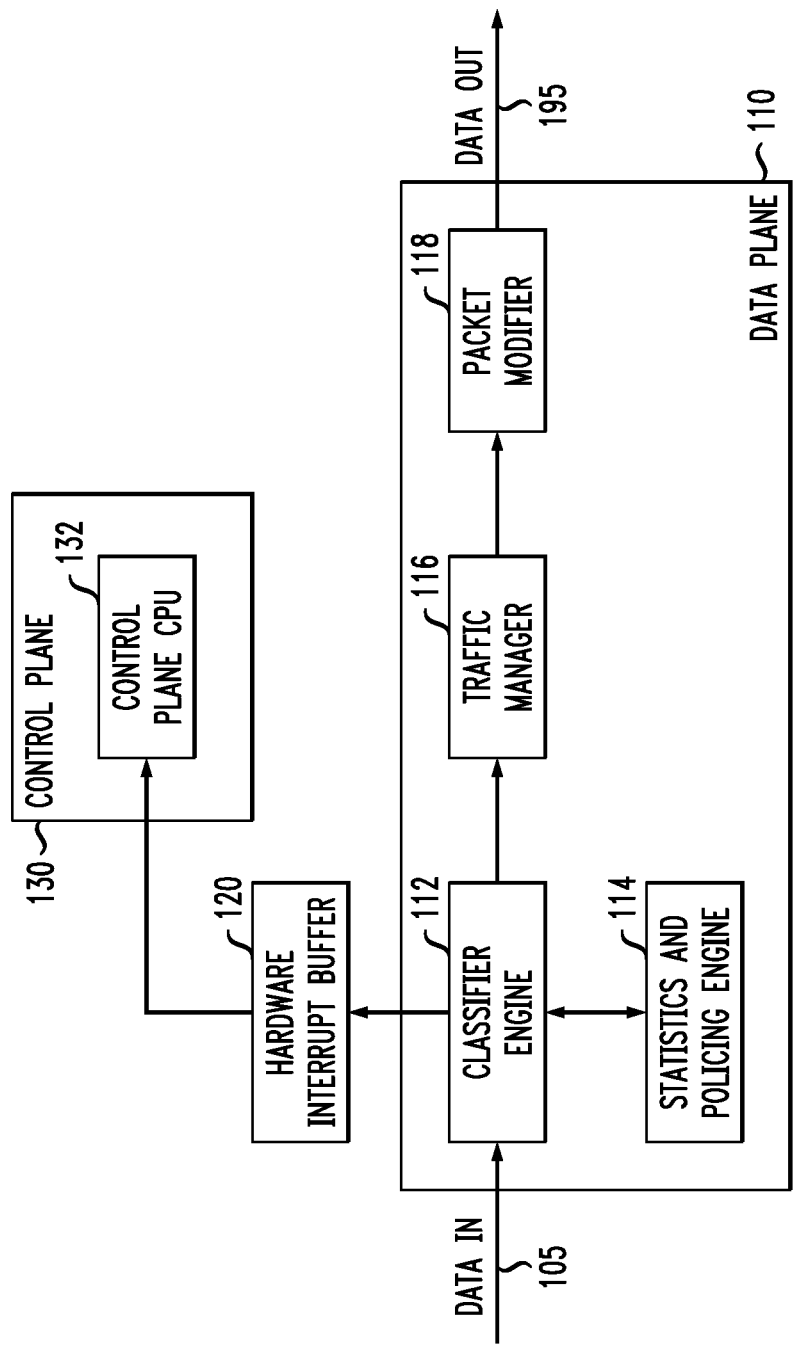
FIG. 1 shows a high-level, simplified block diagram of a network processor unit (NPU) of a packet-based data network, according to one embodiment of the disclosure.

FIG. 1 shows a high-level, simplified block diagram of a network processor unit (NPU) 100 of a packet-based data network, according to one embodiment of the disclosure, where the data network may contain any number of instances of NPU 100 as well as other types of nodes interconnected by appropriate (wired or wireless) communication links NPU 100 receives an incoming stream 105 of data packets (i.e., Data In) from an upstream node (not shown) in the data network, processes that packetized data as appropriate, and transmits an outgoing stream 195 of data packets to a downstream node (not shown) in the data network.

The data-processing functions of NPU 100 are partitioned between (i) a data plane 110, which includes classifier engine 112, statistics and policing (S&P) engine 114, traffic manager 116, and packet modifier 118, and (ii) a control plane 130, which includes control plane central processing unit (CPU) 132. In addition to the data and control planes, NPU 100 also has hardware interrupt buffer 120, which is typically implemented as a first-in, first-out (FIFO) memory device having a fixed size. Control plane CPU 132 executes software associated with a wide variety of control plane operations of NPU 100, including (without limitation) network management and the operator configuration interface. Although not explicitly shown in FIG. 1, data plan 110 and control plane 130 also communicate directly with each other independent of hardware interrupt buffer 120.

Classifier engine 112 parses the fields of the received data packets, coordinates with other computational engines like S&P engine 114 to detect events like counter overflow, and notifies control plane CPU 132 of detected events, e.g., by storing hardware interrupts into hardware interrupt buffer 120 or via a specified fallback method, such as sending the packet to the CPU. S&P engine 114 performs state monitoring, policing, and statistics operations.

Under normal operations, classifier engine 112 forwards incoming packetized data received by NPU 100 via incoming packet stream 105 to traffic manager 116, which performs (at least) the following functions: (1) queuing of received packets from classifier engine 112, (2) scheduling of packets from the queues based on strict priority and/or weighted round robin scheduling algorithms, (3) shaping of packets from the queues to a desired rate, and (4) buffer management or dropping of packets exceeding a certain queue threshold by means of an appropriate algorithm like tail drop or weighted random early detection. In NPU 100, traffic manager 116 has several static parameters and several programmable parameters that are configured from control plane 130. In addition, classifier engine 112 passes some flags to traffic manager 116. The algorithms for traffic shaping, scheduling, and buffer management are implemented in scripts that execute on each packet received from classifier engine 112. Traffic manager 116, in turn, passes the resulting data to packet modifier 118, which modifies select fields of the data packets included in outgoing packet stream 195. Packet modifier 118 can receive inputs from classifier engine 112 as well as from control plane 130, and use these inputs to modify select packet fields. In addition, packet modifier 118 can perform other functions, such as IPv4 fragmentation, computation of CRC (cyclic redundancy check) data, and timestamp extraction.

Classifier engine 112 analyzes the incoming data to detect events that require special handling and then classifies each detected event into one of a finite number of different categories of events. Classifier engine 112 determines whether each detected event should be handled as a hardware interrupt, in which case a corresponding hardware interrupt is stored in hardware interrupt buffer 120. If classifier engine 112 determines that a detected event should not be handled as a hardware interrupt, then a fallback action is performed to handle the detected event. The processing performed by classifier engine 112 to determine whether or not to handle a detected event as a hardware interrupt and the processing associated with fallback actions are described in further detail below with respect to FIGS. 2 and 3. Using conventional interrupt-handling mechanisms, control plane CPU 132 accesses hardware interrupts stored in hardware interrupt buffer 120 on a first-come, first-served basis and performs the appropriate special processing for each hardware interrupt.

At any instant of time, the total amount of memory provisioned for hardware interrupt buffer 120 is represented by (i) an un-available portion corresponding to the fraction of the total provisioned memory currently occupied by previously stored hardware interrupts that are waiting to be serviced by control plane CPU 132 and (ii) if the un-available portion is less than 100% of the total provisioned memory, then a remaining, available portion corresponding to the rest of the total provisioned memory that is currently unoccupied and therefore available to store one or more new hardware interrupts.

According to one embodiment of the disclosure, events are classified into a specified, fixed number of different categories. According to this embodiment, each different event category is assigned a scale factor between 0 and 1, where the sum of the scale factors for all of the different event categories is equal to 1 (i.e., the scale factors are normalized). Whenever one or more new events are detected, the available portion of the hardware interrupt buffer is allocated to the different event categories based on their assigned scale factors. If the amount of memory allocated for a particular category of event is sufficient to store all of the detected new events of that category, then hardware interrupts for all of those events may be immediately stored in the hardware interrupt buffer. If, however, the amount of allocated memory is not sufficient to store all of those detected new events, then one or more of those events cannot be immediately stored in the hardware interrupt buffer. This is true even if there is additional available memory allocated to other categories of events that is not currently needed to handle events of those other categories. Instead, NPU 100 handles those one or more events using an appropriate fallback action.

In one embodiment of the disclosure, NPU 100 is configured with two possible fallback actions. If an event cannot be handled as a hardware interrupt, then NPU 100 attempts to handle the event using a first fallback action. If, for some reason, the event cannot be handled using the first fallback action, then NPU 100 handles the event using a second fallback action.

In one implementation of the disclosure, the first fallback action is the handling of an event (that cannot be handled as a hardware interrupt) as a software interrupt by storing a corresponding software interrupt in a software interrupt buffer. If the software interrupt buffer is full, then the second fallback action is performed. In one implementation of the disclosure, NPU 100 can be programmed to perform a selected one of three different possible second fallback actions: (1) send the data packet corresponding to the event to control plane CPU 132 to handle, (2) re-circulate the data packet back to the input of classifier engine 112 to re-process the data packet at a later time, and (3) simply drop the event.

Figure 2:
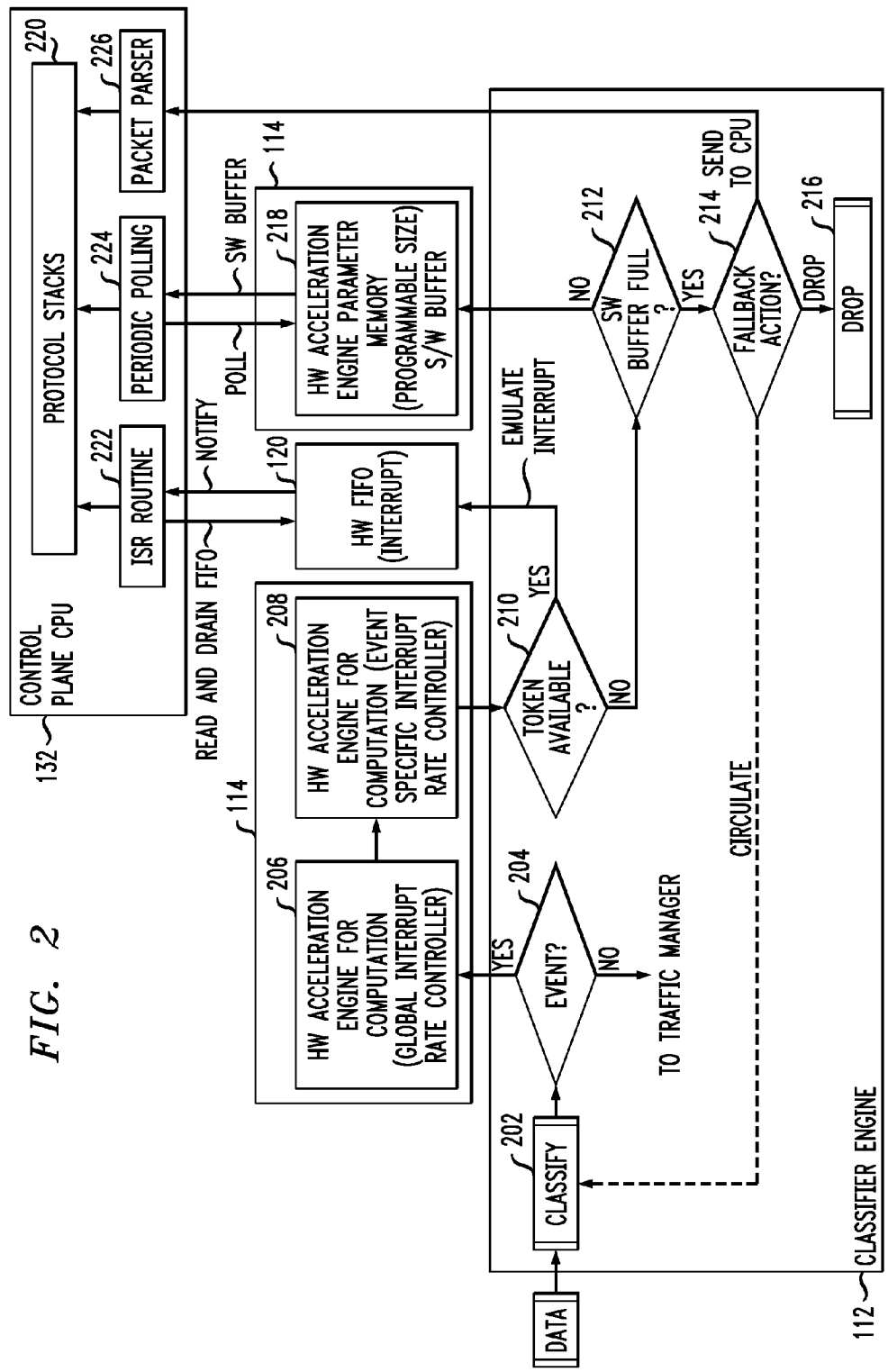
FIG. 2 shows a more-detailed functional block diagram of some of the functions performed by the classifier engine, the statistics and policing (S&P) engine, the control plane central processing unit (CPU), and the hardware interrupt buffer of the NPU of FIG. 1.

FIG. 2 shows a more-detailed functional block diagram of some of the functions performed by classifier engine 112, S&P engine 114, control plane CPU 132, and hardware interrupt buffer 120 of NPU 100 of FIG. 1. At block 202, classifier engine 112 analyzes the incoming packetized data to determine whether an event is detected and, if so, determines the event category for that detected event. If an event is not detected (block 204), then the data is forwarded to traffic manager 116 of FIG. 1 for normal processing. If, on the other hand, an event is detected (block 204), then global interrupt rate controller block 206 in S&P engine 114 determines the total available capacity of hardware interrupt buffer 120, and event-specific interrupt rate controller block 208 in S&P engine 114 determines how much of that total available capacity is allocated to the category corresponding to the detected event. Global and event-specific interrupt rate controller blocks 206 and 208 are scripts executed in S&P engine 114. In the context of this disclosure, these scripts provide vital inputs that enable classifier engine 112 to make a decision on which method to use to handle a detected event.

At block 210, classifier engine 112 then determines whether there is sufficient capacity in hardware interrupt buffer 120 for the detected event. The processing performed by classifier engine 112 to make this determination as well as the processing of controller blocks 206 and 208 are described in further detail below in the context of FIG. 3. If classifier engine 112 determines that there is sufficient capacity, then classifier engine 112 stores a corresponding hardware interrupt for the detected event in hardware interrupt buffer 120. If not, then, at block 212, classifier engine 112 determines whether or not a software interrupt buffer 218 in S&P engine 114 is full. If not, then classifier engine 112 stores a corresponding software interrupt for the detected event in software interrupt buffer 218. Software interrupt buffer 218, which is implemented in S&P engine 114, is used for at least some events that cannot be handled by hardware interrupt buffer 120. The software interrupts stored in software interrupt buffer 218 are polled by control plane CPU 132 and then serviced.

If classifier engine 112 determines, at block 212, that software interrupt buffer 218 is full, then, at block 214, classifier engine 112 selects the pre-programmed second fallback action. According to a first programming choice for the second fallback action, classifier engine 112 sends the data packet corresponding to the detected event to a packet parser 226 in control plane CPU 132. According to a second programming choice, classifier engine 112 re-circulates the data packet back to block 202 to re-process the data packet, by which time, either hardware interrupt buffer 120 or software interrupt buffer 218 may have room for the detected event. According to a third programming choice, classifier engine 112 simply drops the detected event at block 216 without any of the special processing associated with that detected event being performed.

As shown in FIG. 2, control plane CPU 132 includes protocol stacks 220, interrupt service routine (ISR) block 222, periodic polling block 224, and packet parser block 226, which are software-based processing modules. Protocol stacks 220 corresponds to a protocol processing module that contains all the software for processing various protocols, including all of the protocol state machines and other aspects of protocol processing. ISR block 222 is a processing module designed to typically provide fast processing of hardware interrupts stored in hardware interrupt buffer 120. Periodic polling block 224 corresponds to a program or thread that periodically accesses software interrupt buffer 218 to determine whether there are any software interrupts to be serviced. While ISR block 222 is triggered whenever a hardware interrupt is stored in hardware interrupt buffer 120, periodic polling block 224 wakes up periodically to access software interrupt buffer 218. As a result, the processing of interrupts by periodic polling block 224 is typically slower than the processing of interrupts by ISR block 222. Packet parser block 226 parses each received packet within control plane CPU 132, detects and classifies events, and determines how to handle these events within control plane CPU 132.

In one implementation of the disclosure, NPU 100 performs a token-based rate analysis to manage the allocation of available memory in hardware interrupt buffer 120 and the storage of hardware interrupts into that allocated available memory. In particular, at any given instant, the total token bucket size tT for hardware interrupt buffer 120 can be calculated (e.g., by global interrupt rate controller block 206) according to Equation (1) as follows:

$$tT = \Sigma t_i \qquad (1)$$

where:
$t_i$ is the token bucket size representing the number of tokens of event category i that are currently stored in hardware interrupt buffer 120; and
$\Sigma$ represents summation over all of the different event categories.

Note that tokens are measured in units of rate, e.g., number of hardware interrupts per second.

The available hardware interrupt rate (AV_INT), as measured in tokens, for hardware interrupt buffer 120 can be calculated (e.g., by global interrupt rate controller block 206) according to Equation (2) as follows:

$$AV\_INT = ptT - \Sigma t_i, \qquad (2)$$

where:
global threshold ptT is the upper bound on the maximum number of tokens that can be accumulated at any instant in a token bucket that represents hardware interrupt buffer 120, which governs the maximum allowable interrupt rate.

When an event of the ith event category is detected, the token bucket size $t_i$ for the ith event category is updated (e.g., by event specific interrupt rate controller block 208) according to Equation (3) as follows:

$$t_i = t_i + C_i + AV\_INT * INT\_SCALE\_i, \qquad (3)$$

where:
$C_i$ is a specified constant for the ith event category representing a pre-determined fraction of the maximum rate (pti) that control plane CPU 132 can process hardware events of category i; and
INT_SCALE_i is the scale factor assigned to the ith event category.

Since there is a maximum, committed rate (pti) that control plane CPU 132 can process hardware interrupts of event category i, the token bucket size $t_i$ is limited to that maximum rate pti, if appropriate. Suitable values for the programmable parameters $C_i$, pti, and INT_SCALE_i are determined by the system implementer based on empirical knowledge of the system and the relative importance of the various events.

In general, if the token bucket size $t_i$ is greater than the rate ($b_i$) at which events of event category i are being detected by classifier engine 112, then a newly detected event of the ith event category can be handled as a hardware interrupt. Otherwise, it cannot, and either the first or, if necessary, the second fallback action is performed to handle the detected event.

Figure 3:
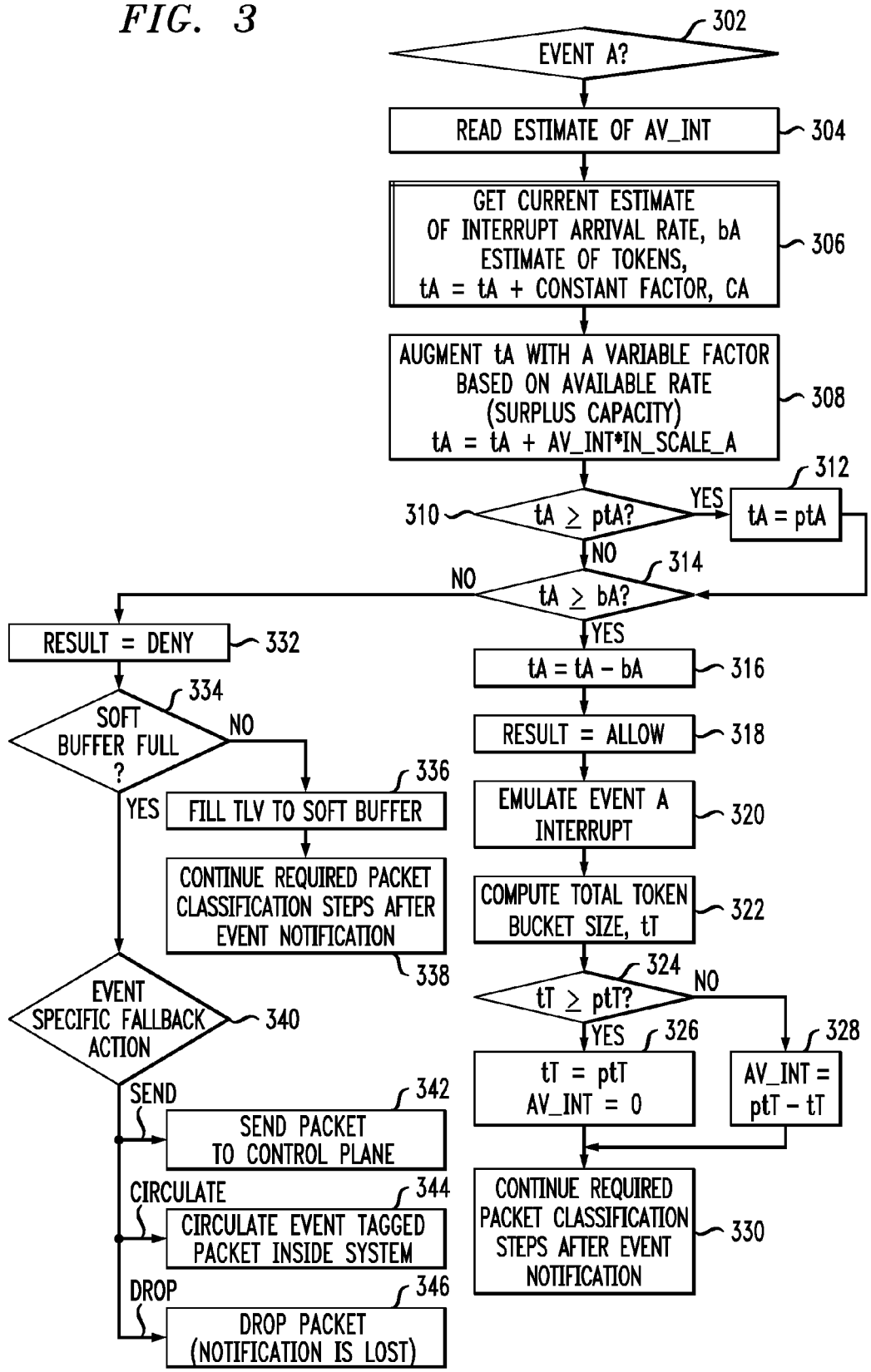
FIG. 3 shows a process flow diagram that represents the processing of the classifier engine and the S&P engine of FIG. 2 associated with determining how to handle a detected event of a particular category.

FIG. 3 shows a process flow diagram that represents the processing of classifier engine 112 and S&P engine 114 associated with determining how to handle a detected event of category i. If classifier engine 112 detects an event of category i (step 302), then the total available interrupt rate (AV_INT) is retrieved from global interrupt rate controller block 206 (step 304).

At step 306, event specific interrupt rate controller block 208 generates the interrupt arrival rate ($b_i$) for event category i and increments the token bucket size $t_i$ by the constant $C_i$. At step 308, controller block 208 increases the token bucket size $t_i$ by the specified fraction of the total available interrupt rate that is allocated to the ith event category. Note that steps 306 and 308 correspond to Equation (3).

If the token bucket size $t_i$ is greater than the maximum rate PTi (step 310), then, in step 312, controller block 208 limits the token bucket size $t_i$ to be equal to that maximum rate pti.

If the token bucket size $t_i$ is greater than or equal to the arrival rate $b_i$ (step 314), then the detected event can be handled as a hardware interrupt. In that case, at step 316, controller block 208 decrements the token bucket size $t_i$ by the arrival rate $b_i$ (to be ready for the next detected event of any category) and, at step 318, controller block 208 indicates to classifier engine 112 that the detected event can be handled as a hardware interrupt.

In that case, at step 320, classifier engine 112 stores an appropriate hardware interrupt in hardware interrupt buffer 120 for the detected event.

Global interrupt rate controller block 206 then updates values to be ready for the next detected event of any category. In particular, at step 322, controller block 206 calculates the total token bucket size tT according to Equation (1).

If the total token bucket size tT is greater than or equal to the global threshold ptT (step 324), then, at step 326, the total token bucket size tT is limited to the global threshold ptT, and the available hardware interrupt rate AV_INT is set of zero. Otherwise, at step 328, the available hardware interrupt rate AV_INT is equal to the global threshold ptT minus the total token bucket size tT. In either case, conventional data-plane processing continues at step 330.

Returning to step 314, if the token bucket size t, is not greater than or equal to the arrival rate $b_i$, then controller block 208 determines that the detected event cannot be handled as a hardware interrupt. In that case, at step 332, controller block 208 indicates to classifier engine 112 that the detected event cannot be handled as a hardware interrupt.

If classifier engine 112 determines that there is room in software interrupt buffer 218 (step 334), then, at step 336, classifier engine 112 stores an appropriate software interrupt in software interrupt buffer 218 for the detected event, and conventional data-plane processing continues at step 338. Otherwise, at step 340, classifier engine 112 selects the programmed, second fallback action, which is one of (1) sending the packet to the control plane (step 342), (2) re-circulating the packet back to block 202 (step 344), and (3) dropping the event (step 346). In most situations, an event is associated with the arrival of a packet. When an event that is associated with an incoming packet is to be dropped, then the entire packet is dropped. One exception is a counter overflow that is not directly associated with an incoming packet. In a well-designed system, counter overflow events are given a relatively high, if not the highest, priority. As such, counter overflow events would likely, and possibly always, be handled as hardware interrupts and therefore never get dropped.

If higher scale factors (i.e., INT_SCALE_i) and higher committed rates (i.e., PTi) are programmably selected for more-critical events, then the detection of a large number of less-critical events in a short period of time will be less likely to fill the hardware interrupt buffer, thereby enabling the node to handle subsequently detected, more-critical events using the hardware interrupt buffer, while some of those less-critical events will be handled using an appropriate fallback action.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A node-implemented method for handling events by a node in a data network, the node-implemented method comprising:
   (a) processing data received at the node to detect an event;
   (b) classifying the detected event as being one of a plurality of different categories of events;
   (c) determining, based on the classified category of the detected event, whether to handle the detected event using a hardware interrupt buffer of the node, wherein step (c) comprises:
      (c1) determining a token bucket size for the classified category; and
      (c2) comparing the token bucket size to a committed rate of service for the classified category to determine whether to handle the detected event using the hardware interrupt buffer;
   (d) storing, in the hardware interrupt buffer, a hardware interrupt corresponding to the detected event, if the determination is to handle the detected event using the hardware interrupt buffer; and
   (e) handling the detected event using a fallback action, if the determination is not to handle the detected event using the hardware interrupt buffer.

2. The invention of claim 1, wherein determining whether to handle the detected event using the hardware interrupt buffer is based on an available hardware interrupt rate for the hardware interrupt buffer and a scale factor for the classified category.

3. The invention of claim 1, wherein:

$$t_i = t_i + C_i + AV\_INT * INT\_SCALE\_i,$$

where:
   $t_i$ is a token bucket size for event category i;
   $C_i$ is a maximum rate for event category i;
   AV_INT is an available hardware interrupt rate for the hardware interrupt buffer; and
   INT_SCALE_i is a scale factor for event category i.

4. The invention of claim 3, wherein step (e) comprises:
   (e1) determining whether to handle the detected event using a software interrupt buffer of the node;
   (e2) storing, in the software interrupt buffer, a software interrupt corresponding to the detected event, if the determination is to handle the detected event using the software interrupt buffer; and
   (e3) if the determination is not to handle the detected event using the software interrupt buffer, then handling the detected event using one of:
      (i) sending a data packet corresponding to the detected event to a control plane CPU of the node;
      (ii) re-circulating the data packet corresponding to the detected event for reprocessing according to steps (a)-(c); and
      (iii) dropping the detected event.

5. The invention of claim 1, wherein the fallback action is storing a software interrupt corresponding to the detected event in a software interrupt buffer of the node.

6. The invention of claim 1, wherein the fallback action is sending a data packet corresponding to the detected event to a control plane CPU of the node.

7. The invention of claim 1, wherein the fallback action is re-circulating a data packet corresponding to the detected event for reprocessing according to steps (a)-(c).

8. The invention of claim 1, wherein the fallback action is dropping the detected event.

9. The invention of claim 1, wherein step (e) comprises:
   (e1) determining whether to handle the detected event using a software interrupt buffer of the node;
   (e2) storing, in the software interrupt buffer, a software interrupt corresponding to the detected event, if the determination is to handle the detected event using the software interrupt buffer.

10. The invention of claim 9, wherein step (e) comprises:
    (e3) if the determination is not to handle the detected event using the software interrupt buffer, then handling the detected event using one of:
       (i) sending a data packet corresponding to the detected event to a control plane CPU of the node;
       (ii) re-circulating the data packet corresponding to the detected event for reprocessing according to steps (a)-(c); and
       (iii) dropping the detected event.

11. A node for a data network, the node comprising:
    a hardware interrupt buffer;
    a data plane configured to:
       (a) process data received at the node to detect an event;
       (b) classify the detected event as being one of a plurality of different categories of events;
       (c) determine, based on the classified category of the detected event, whether to handle the detected event using the hardware interrupt buffer, wherein, to determine whether to handle the detected event using the interrupt buffer, the data plane is configured to:
          (c1) determine a token bucket size for the classified category; and
          (c2) compare the token bucket size to a committed rate of service for the classified category to determine whether to handle the detected event using the hardware interrupt buffer;
       (d) store, in the hardware interrupt buffer, a hardware interrupt corresponding to the detected event, if the determination is to handle the detected event using the hardware interrupt buffer; and
       (e) handle the detected event using a fallback action, if the determination is not to handle the detected event using the hardware interrupt buffer; and
    a control plane configured to process the hardware interrupt stored in the hardware interrupt buffer.

12. The invention of claim 11, wherein the data plane determining whether to handle the detected event using the hardware interrupt buffer is based on an available hardware interrupt rate for the hardware interrupt buffer and a scale factor for the classified category.

13. The invention of claim 11, wherein the data plane determines the token bucket size $t_i$ for the event category i according to:

$$t_i = t_i + C_i + AV\_INT * INT\_SCALE\_i,$$

where:
   $C_i$ is a maximum rate for event category i;
   AV_INT is an available hardware interrupt rate for the hardware interrupt buffer; and
   INT_SCALE_i is a scale factor for event category i.

14. The invention of claim 13, wherein the data plane is configured to handle the detected event using the fallback action by:
   (e1) determining whether to handle the detected event using a software interrupt buffer of the node;
   (e2) storing, in the software interrupt buffer, a software interrupt corresponding to the detected event, if the determination is to handle the detected event using the software interrupt buffer; and (e3) handling the detected event using one of:
  (i) sending a data packet corresponding to the detected event to a control plane CPU of the node;
  (ii) re-circulating the data packet corresponding to the detected event for reprocessing according to steps (a)-(c); and
  (iii) dropping the detected event.

15. The invention of claim 11, wherein the data plane is configured to handle the detected event using the fallback action by:
  (e1) determining whether to handle the detected event using a software interrupt buffer of the node;
  (e2) storing, in the software interrupt buffer, a software interrupt corresponding to the detected event, if the determination is to handle the detected event using the software interrupt buffer.

16. The invention of claim 15, wherein:
  (e3) if the determination is not to handle the detected event using the software interrupt buffer, then handling the detected event using one of:
    (i) sending a data packet corresponding to the detected event to a control plane CPU of the node;
    (ii) re-circulating the data packet corresponding to the detected event for reprocessing according to steps (a)-(c); and
    (iii) dropping the detected event.

17. A node-implemented method for handling events by a node in a data network, the node-implemented method comprising:
  (a) processing data received at the node to detect an event;
  (b) classifying the detected event as being one of a plurality of different categories of events;
  (c) determining, based on the classified category of the detected event, whether to handle the detected event using a hardware interrupt buffer of the node;
  (d) storing, in the hardware interrupt buffer, a hardware interrupt corresponding to the detected event, if the determination is to handle the detected event using the hardware interrupt buffer; and
  (e) handling the detected event using a fallback action, if the determination is not to handle the detected event using the hardware interrupt buffer, wherein the fallback action is storing a software interrupt corresponding to the detected event in a software interrupt buffer of the node.

18. A node-implemented method for handling events by a node in a data network, the node-implemented method comprising:
  (a) processing data received at the node to detect an event;
  (b) classifying the detected event as being one of a plurality of different categories of events;
  (c) determining, based on the classified category of the detected event, whether to handle the detected event using a hardware interrupt buffer of the node;
  (d) storing, in the hardware interrupt buffer, a hardware interrupt corresponding to the detected event, if the determination is to handle the detected event using the hardware interrupt buffer; and
  (e) handling the detected event using a fallback action, if the determination is not to handle the detected event using the hardware interrupt buffer, wherein the fallback action is sending a data packet corresponding to the detected event to a control plane CPU of the node.

19. A node-implemented method for handling events by a node in a data network, the node-implemented method comprising:
  (a) processing data received at the node to detect an event;
  (b) classifying the detected event as being one of a plurality of different categories of events;
  (c) determining, based on the classified category of the detected event, whether to handle the detected event using a hardware interrupt buffer of the node;
  (d) storing, in the hardware interrupt buffer, a hardware interrupt corresponding to the detected event, if the determination is to handle the detected event using the hardware interrupt buffer; and
  (e) handling the detected event using a fallback action, if the determination is not to handle the detected event using the hardware interrupt buffer, wherein the fallback action is re-circulating a data packet corresponding to the detected event for reprocessing according to steps (a)-(c).

20. A node-implemented method for handling events by a node in a data network, the node-implemented method comprising:
  (a) processing data received at the node to detect an event;
  (b) classifying the detected event as being one of a plurality of different categories of events;
  (c) determining, based on the classified category of the detected event, whether to handle the detected event using a hardware interrupt buffer of the node;
  (d) storing, in the hardware interrupt buffer, a hardware interrupt corresponding to the detected event, if the determination is to handle the detected event using the hardware interrupt buffer; and
  (e) handling the detected event using a fallback action, if the determination is not to handle the detected event using the hardware interrupt buffer, wherein step (e) comprises:
    (e1) determining whether to handle the detected event using a software interrupt buffer of the node;
    (e2) storing, in the software interrupt buffer, a software interrupt corresponding to the detected event, if the determination is to handle the detected event using the software interrupt buffer.

21. The invention of claim 20, wherein step (e) comprises:
  (e3) if the determination is not to handle the detected event using the software interrupt buffer, then handling the detected event using one of:
    (i) sending a data packet corresponding to the detected event to a control plane CPU of the node;
    (ii) re-circulating the data packet corresponding to the detected event for reprocessing according to steps (a)-(c); and
    (iii) dropping the detected event.

22. A node for a data network, the node comprising:
a hardware interrupt buffer;
a data plane configured to:
  (a) process data received at the node to detect an event;
  (b) classify the detected event as being one of a plurality of different categories of events;
  (c) determine, based on the classified category of the detected event, whether to handle the detected event using the hardware interrupt buffer;
  (d) store, in the hardware interrupt buffer, a hardware interrupt corresponding to the detected event, if the determination is to handle the detected event using the hardware interrupt buffer; and
  (e) handle the detected event using a fallback action, if the determination is not to handle the detected event using the hardware interrupt buffer, wherein the data plane is configured to handle the detected event using the fallback action by:

(e1) determining whether to handle the detected event using a software interrupt buffer of the node;

(e2) storing, in the software interrupt buffer, a software interrupt corresponding to the detected event, if the determination is to handle the detected event using the software interrupt buffer; and a control plane configured to process the hardware interrupt stored in the hardware interrupt buffer.

23. The invention of claim 22, wherein:

(e3) if the determination is not to handle the detected event using the software interrupt buffer, then handling the detected event using one of:
  (i) sending a data packet corresponding to the detected event to a control plane CPU of the node;
  (ii) re-circulating the data packet corresponding to the detected event for reprocessing according to steps (a)-(c); and
  (iii) dropping the detected event.

* * * * *